H. LUPHER & D. S. MUNGER.

Hay and Cotton Presses.

No. 153,584. Patented July 28, 1874.

WITNESSES:
G. Matthys
John C. Kenon

INVENTOR:
H. Lupher
D. S. Munger
BY
Munn & Co.
ATTORNEYS.

UNITED STATES PATENT OFFICE.

HIRAM LUPHER AND DEXTER S. MUNGER, OF TULLAHOMA, TENNESSEE.

IMPROVEMENT IN HAY AND COTTON PRESSES.

Specification forming part of Letters Patent No. 153,584, dated July 28, 1874; application filed June 4, 1874.

*To all whom it may concern:*

Be it known that we, HIRAM LUPHER and DEXTER S. MUNGER, of Tullahoma, in the county of Coffee and State of Tennessee, have invented a new and Improved Hay and Cotton Press; and we do hereby declare that the following is a full, clear, and exact description of the same, reference being had to the accompanying drawing forming part of this specification, in which—

Figure 1:
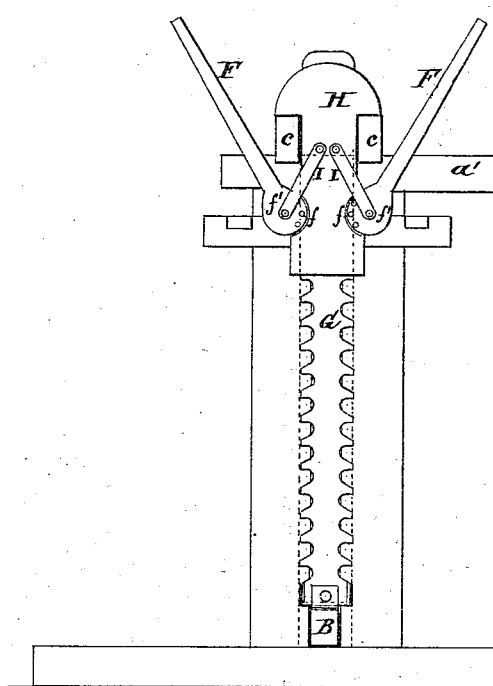
Figure 2:
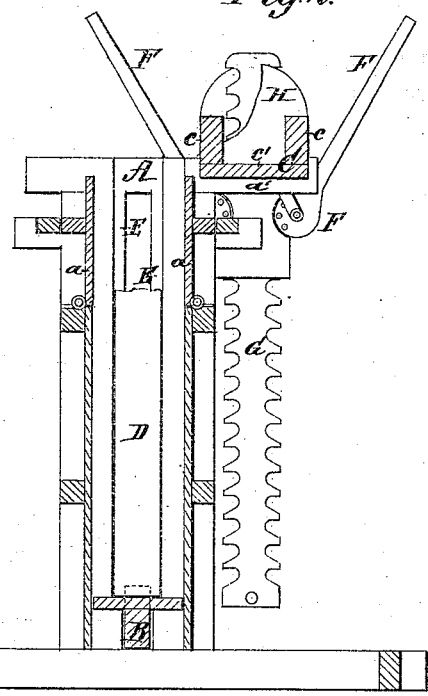
Figure 3:
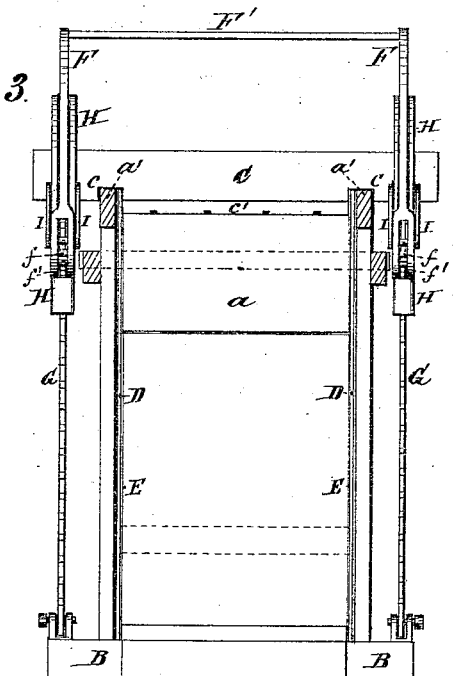

Figure 1 is a side, and Figs. 2 and 3 sectional, elevations.

The invention will first be fully described, and then pointed out in the claim.

A represents a press-box, fixed upon a suitable base, having hinged doors *a a* for the outlet of bale, and provided with a follower, B. The top or cover C consists of two cross-bars, *c c*, connected by a board, *c'*, and transversely notched to fit upon the bars *a' a'* of the press-box. This cover is also permitted to slide to one side when the loose hay or cotton is to be entered; but is held securely in position afterward by detachable end pieces D D, that slide in and out of the ways or guides E E. F F are arc-ended levers, having rivets *f f*, connecting the curved plates *f' f'* near their circumference, and working in the teeth of rack-bars G G. The latter are pivoted or attached in any suitable manner to follower B, and slide up and down between guide-plates H H. With the latter the levers F F are connected by pivoted straps I I, thus allowing the levers to be readily drawn back from the teeth of rack and giving them a movable fulcrum that changes its position as the levers are moved.

By having a pair of these levers on each opposite side and connecting the two of a pair by a cross-bar, F, two men are enabled to act simultaneously on both sides of each end of follower, thereby causing it to move up squarely and uniformly with the least possible friction.

Having thus described our invention, what we claim as new is—

The sliding and detachable end pieces D D, working in guides of press-box, and combined, as described, with the cover C to hold the latter firmly in place during the act of compression, and yet allow it to be slid to one side for the introduction of hay or cotton.

HIRAM LUPHER.
DEXTER S. MUNGER.

Witnesses:
Jo. B. SMITH,
Jo. H. SMITH.